US012625390B2

(12) United States Patent    (10) Patent No.:    US 12,625,390 B2

Quiter et al.    (45) Date of Patent:    May 12, 2026

(54) CONTACT LENSES AND METHODS RELATING THERETO

(71) Applicant: CooperVision International Limited, Fareham (GB)

(72) Inventors: Caeli Quiter, Southampton (GB); Martin Webber, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 130 days.

(21) Appl. No.: 18/777,586

(22) Filed: Jul. 19, 2024

(65) Prior Publication Data

US 2025/0035960 A1    Jan. 30, 2025

Related U.S. Application Data

(60) Provisional application No. 63/528,655, filed on Jul. 25, 2023.

(51) Int. Cl.
*G02C 7/04*    (2006.01)
*A61F 9/02*    (2006.01)
*G02C 7/02*    (2006.01)

(52) U.S. Cl.
CPC .................................... *G02C 7/044* (2013.01)

(58) Field of Classification Search
CPC . G02C 7/061; G02C 7/02; G02C 7/04; G02C 7/042; G02C 7/046; G02C 7/10;
(Continued)

(56) References Cited

U.S. PATENT DOCUMENTS 8,641,192 B2 * 2/2014 Arrigotti ................... B24B 1/00
264/1.32
10,877,294 B2 12/2020 Lau et al.
(Continued)

FOREIGN PATENT DOCUMENTS

CN    115826264 A    3/2023
GB    1561892 A    3/1980
(Continued)

OTHER PUBLICATIONS

PCT Demand filed May 16, 2025 in corresponding International Patent Application No. PCT/GB2024/051917 (15 pages).
(Continued)

*Primary Examiner* — Dawayne Pinkney

(74) *Attorney, Agent, or Firm* — Kilyk & Bowersox, P.L.L.C.

(57)      ABSTRACT

A contact lens (2001) and methods of manufacturing such a lens (2001) are described. The contact lens (2001) comprises an optic zone (202). The optic zone (202) comprises a central portion having a centre of curvature that is on an optical axis (219), and a first annular portion (203) extending radially outwards from the central portion (205). The first annular portion (203) provides a curvature add power. One of an anterior surface and a posterior surface of the first annular portion (203) has a centre of curvature that is on the optical axis (219). The other of the anterior surface and the posterior surface of the first annular portion (203) has a centre of curvature that is separated by a first distance from the optical axis (219).

21 Claims, 13 Drawing Sheets

(58) Field of Classification Search

CPC ........ G02C 7/041; G02C 7/022; G02C 7/044; G02C 2202/24; A61F 2/1613; A61F 9/026; B29D 11/00038

USPC ........ 351/159.02, 41, 159.01, 159.1, 159.06, 351/159.12, 159.14, 159.08, 159.09, 351/159.24, 159.31, 159.6, 159.64, 351/159.73, 159.74

See application file for complete search history.

(56) References Cited

U.S. PATENT DOCUMENTS

| | | | |
|---|---|---|---|
| 11,061,255 | B2 | 7/2021 | Lau et al. |
| 2013/0182215 | A1 | 7/2013 | Tung |
| 2015/0316788 | A1* | 11/2015 | Holden ................. A61F 2/1451 351/159.42 |
| 2021/0191155 | A1 | 6/2021 | Brennan et al. |
| 2022/0197060 | A1* | 6/2022 | Chamberlain ........... G02C 7/04 |
| 2023/0194896 | A1 | 6/2023 | Webber et al. |
| 2023/0408845 | A1* | 12/2023 | Bradley ................. G02C 7/041 |

FOREIGN PATENT DOCUMENTS

| | | |
|---|---|---|
| GB | 2561910 A | 10/2018 |
| WO | 2023118813 A1 | 6/2023 |

OTHER PUBLICATIONS

Second Written Opinion issued in corresponding International Patent Application No. PCT/GB2024/051917 dated Jun. 24, 2025 (5 pages).

Response to Second Written Opinion filed Jul. 11, 2025 in corresponding International Patent Application No. PCT/GB2024/051917 (14 pages).

Search and Examination Report issued in corresponding United Kingdom Patent Application No. GB 2410676.7 dated Sep. 13, 2024 (10 pages).

International Search Report and Written Opinion issued in corresponding International Patent Appln. No. PCT/GB2024/051917 dated Oct. 22, 2024 (13 pages).

International Preliminary Report on Patentability issued in corresponding International Patent Application No. PCT/GB2024/051917 dated Oct. 27, 2025 (14 pages).

* cited by examiner

CONTACT LENSES AND METHODS RELATING THERETO

This application claims the benefit under 35 U.S.C. § 119(e) of prior U.S. Provisional Patent Application No. 63/528,655, filed Jul. 25, 2023, which is incorporated in its entirety by reference herein.

The present invention relates to contact lenses. The present invention relates especially, but not exclusively, to contact lenses for slowing the progression of myopia. The present invention also relates to methods of manufacturing such lenses.

BACKGROUND

Many people, including children and adults require contact lenses to correct for myopia (short-sightedness). Myopic eyes focus incoming light from distant objects to a location in front of the retina. Consequently, the light converges towards a plane in front of the retina and diverges towards, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach to correct for myopia is to provide lenses having both one or more regions that provide full correction of distance vision and one or more regions that under-correct, or deliberately induce, myopic defocus. It has been suggested that this approach can prevent or slow down the development or progression of myopia in children or young people, whilst providing good distance vision.

In the case of lenses having regions that provide defocus, the regions that provide full-correction of distance vision are usually referred to as base power regions and the regions that provide under-correction or deliberately induce myopic defocus are usually referred to as myopic defocus regions or add power regions (because the dioptric power is more positive, or less negative, than the power of the distance regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens).

A known type of contact lens that reduces the progression of myopia is a dual-focus contact lens, available under the name of MISIGHT (CooperVision, Inc.). This dual-focus lens is different to bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers can make use of the additional focus in front of the retina that results from the annular add power region to focus near objects; in other words, wearers can inadvertently use the lenses in the same manner as presbyopia correction lenses are used, which is undesirable for young subjects.

For treating myopia, it is recognised that it may be beneficial to provide a lens that introduces additional myopic defocus. For treating presbyopia, it may be beneficial to provide a lens that gives rise to an extended depth of focus.

Further lenses have been developed which can be used in the treatment of myopia, and which are designed to eliminate the halo that is observed around focused distance images. In these lenses, the annular region is configured such that no single, on-axis image is formed in front of the retina, thereby preventing such an image from being used to avoid the need for the eye to accommodate near targets. Rather, distant point light sources are imaged by the annular region to a ring-shaped focal line at a near add power focal surface, leading to a small spot size of light, without a surrounding 'halo' effect, on the retina at a distance focal surface.

SUMMARY

The present disclosure provides, according to a first aspect, a contact lens comprising an optic zone. The optic zone comprises a central portion having a centre of curvature that is on an optical axis. The optic zone comprises a first annular portion extending radially outwards from the central region. The first annular portion provides a radial curvature add power. One of an anterior surface and a posterior surface of the first annular portion has a centre of curvature that is on the optical axis. The other of the anterior surface and the posterior surface of the first annular portion has a centre of curvature that is separated by a first distance from the optical axis.

The present disclosure provides, according to a second aspect, a method of manufacturing a contact lens according to the first aspect. The method comprises forming a contact lens. The lens comprises an optic zone. The optic zone comprises a central portion having a centre of curvature that is on an optical axis, and a first annular portion extending radially outwards from the central portion. The first annular portion provides a radial curvature add power. One of an anterior surface and a posterior surface of the first annular portion has a centre of curvature that is on the optical axis. The other of the anterior surface and the posterior surface of the first annular portion has a centre of curvature that is separated by a first distance from the optical axis.

The present disclosure provides, according to a third aspect, a method of reducing progression of myopia. The method comprises providing a contact lens according to the first aspect to a myopic person who is able to accommodate for varying near distances.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE DRAWINGS

Embodiments of the present invention will now be described by way of example only with reference to the accompanying schematic drawings of which.

DETAILED DESCRIPTION

Figures 1A, 1B:
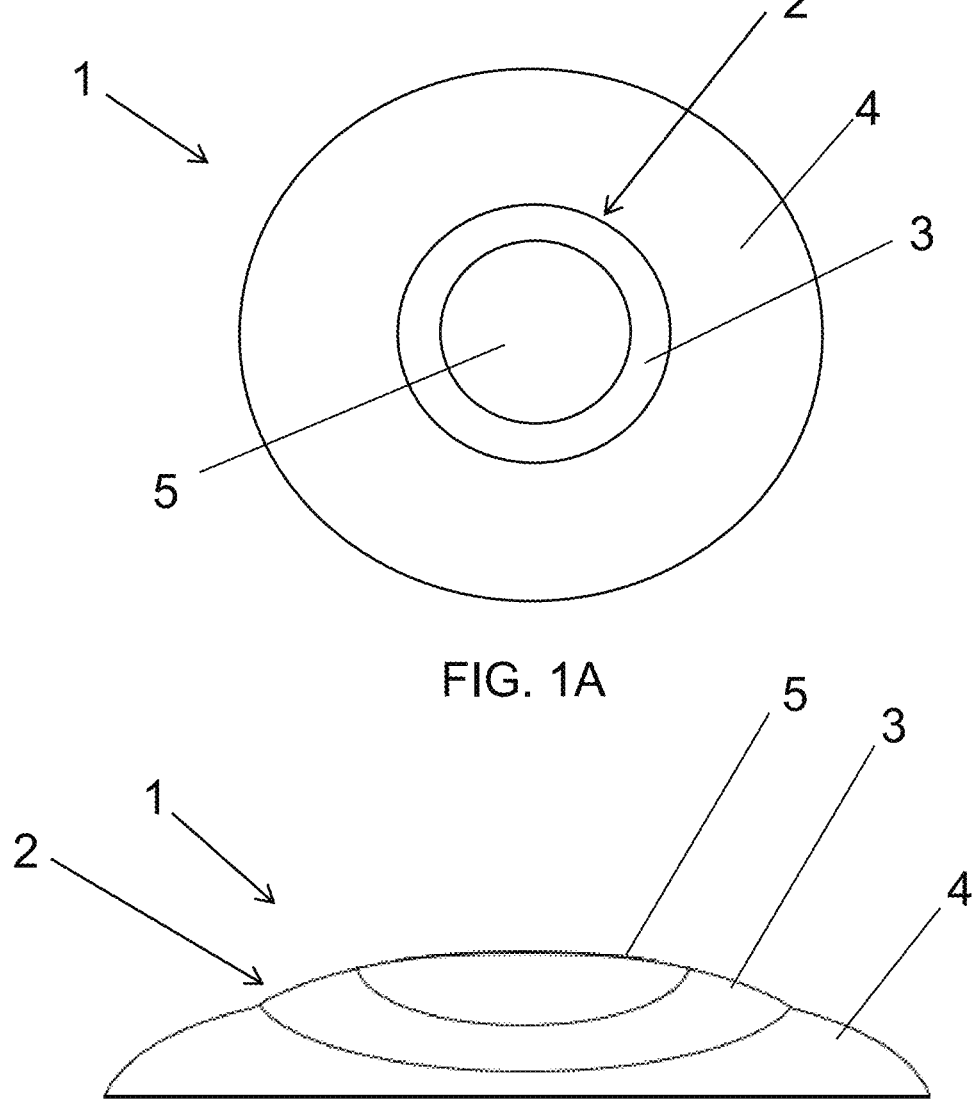
FIG. 1A is a schematic top view of a surface of a contact lens according to an embodiment of the present disclosure.
FIG. 1B is a side view of the lens surface of FIG. 1A.

The present disclosure provides, according to a first aspect, a contact lens comprising an optic zone. The optic zone comprises a central portion having a centre of curvature that is on an optical axis, and a first annular portion extending radially outwards from the central portion. The first annular portion provides a radial curvature add power. One of an anterior surface and a posterior surface of the first annular portion has a centre of curvature that is on the optical axis. The other of the anterior surface and the posterior surface of the first annular portion has a centre of curvature that is separated by a first distance from the optical axis.

The surface of the first annular portion that has a centre of curvature that is on the optical axis will focus light from an on-axis distant point source that falls incident on the lens, in a direction parallel to the optical axis of the lens, to a point that is on the optical axis. The surface of the first annular portion that has a centre of curvature that is separated by a first distance from the optical axis will focus light from an on-axis distant point source that falls incident on the lens, in a direction parallel to the optical axis of the lens, to a point that is separated by a second distance from the optical axis.

The anterior lens surface and posterior lens surface of the first annular portion are aligned such that they share a common optical axis.

As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). The contact lens may be a soft contact lens, such as a hydrogel contact lens or a silicone hydrogel contact lens.

A contact lens according to the present disclosure comprises an optic zone. The optic zone encompasses parts of the lens that have optical functionality. The optic zone is configured to be positioned over the pupil of an eye when in use. For contact lenses according to the present disclosure, the optic zone comprises the central portion and the first annular portion that extends radially outwards from the central portion. The optic zone may comprise additional annular portions that are concentric to the first annular portion. The optic zone may be surrounded by a peripheral zone. The peripheral zone is not part of the optic zone, but sits outside the optic zone and above the iris when the lens is worn, and it provides mechanical functions, for example, increasing the size of the lens thereby making the lens easier to handle, providing ballasting to prevent rotation of the lens, and/or providing a shaped region that improves comfort for the lens wearer. The peripheral zone may extend to the edge of the contact lens.

A contact lens according to an embodiment of the disclosure may include a ballast to orient the lens when positioned on the eye of a wearer. Embodiments of the disclosure incorporating a ballast into the contact lens will, when placed on the eye of a wearer, rotate under the action of the wearer's eyelid to a pre-determined angle of repose; for example, the ballast may be a wedge and the rotation may result from the action of the eyelid on the wedge. It is well-known in the art to ballast a contact lens to orient a contact lens; for example, toric contact lenses are ballasted to orient the lens so that the orthogonal cylindrical corrections provided by the lens align correctly for the astigmatism of the wearer's eye.

The contact lens may be substantially circular in shape and have a diameter from about 4 mm to about 20 mm. The optic zone may be substantially circular in shape and may have a diameter from about 2 mm to about 10 mm. In some embodiments, the contact lens has a diameter from 13 mm to 15 mm, and the optic zone has a diameter from 7 mm to 9 mm.

The optical axis may lie along the centreline of the lens. The central region may focus light from a distant point object, on the optical axis, to a spot on the optical axis at a distal focal surface. The term focal surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina. Therefore the eye does not focus light onto a flat mathematical plane. However, in the art, the curved surface of the retina is commonly referred to as a plane.

The central portion of the lens may be substantially circular in shape and may have diameter of between about 2 and about 9 mm, preferably between about 2.5 and about 4 mm. The central portion may be substantially elliptical in shape.

The first annular portion may extend radially outwards from a perimeter of the central portion by between about 0.1 to about 4 mm, preferably between about 0.5 to about 1.5 mm. The radial width of the first annular portion may therefore be about 0.1 mm to about 4 mm, and preferably may be about 0.5 mm to about 1.5 mm. The perimeter of the central portion may define a boundary between the central region and the first annular portion, and the first annular portion may therefore be adjacent to the central portion.

In the context of the present disclosure, the first annular portion is a substantially annular portion that surrounds the central portion. It may have a substantially circular shape or a substantially elliptical shape. It may fully surround the central portion. It may partially surround the central portion. The first annular portion may abut the central portion. A blending region may be provided between the central portion and the first annular portion. The blending region should not substantially affect the optics provided by the central portion and the first annular portion, and the blending region may have a radial width of 0.05 mm or less, although it may also be as wide as 0.2 mm, or as wide as 0.5 mm in some embodiments.

The central portion of the lens has an anterior surface, which, when the contact lens is worn by a lens wearer, is the front, or forward facing surface that is not in contact with the lens wearer's eye. The central portion of the lens has a posterior surface, which, when the contact lens is worn by a lens wearer, is the rear, or rearward facing surface that is in contact with the lens wearer's eye. The first annular portion also has an anterior surface, which when the contact lens is worn by a lens wearer, will be the front, or forward facing surface that is not in contact with the lens wearers eye. The first annular portion has a posterior surface, which when the contact lens is worn by a lens wearer, will be the rear facing surface that will be in contact with the lens wearer's eye.

As used herein, the term sagittal power (also known as axial power or slope-based power) at a point on the lens surface is used to describe the optical power of a lens obtained using the position at which rays passing through the lens surface at that point cross the optical axis of the lens (which is why sagittal power is also known as axial power). Curvature power (also known as local power or instantaneous power) is the power provided by the radius of curvature at a point on the lens surface. When the variation of power with radius of a lens is plotted in the prior art, it is generally the sagittal power that is plotted.

As the skilled person will understand, sagittal power can be calculated from the slope (i.e. first derivative) of a wavefront that has passed through the lens (which is why sagittal power is also known as slope-based power) and curvature power can be calculated from the second derivative of a wavefront that has passed through the lens. A wavefront can be measured using a Shack-Hartmann wavefront sensor. For example, the curvature and sagittal powers can be understood as follows:

For a spherical wavefront W, at a point a radial distance r (pupil radius) from a line normal to the centre of the wavefront, $W(r)=A*r^2$, where A is a function. The wavefront curvature or curvature power, $P_c$, is a function of the second derivative of the wavefront. The wavefront slope or sagittal power $P_S$, is a function of the first derivative of the wavefront and varies with the slope of the wavefront.

The curvature power, $P_c$, is $$\frac{\partial^2 W}{\partial r^2}$$

and, for a simple spherical lens, is $$\frac{\partial(2Ar)}{\partial r} = 2A.$$

The sagittal power, $P_S$, is s $$\frac{1}{r}\frac{\partial W}{\partial r}$$

and for a simple spherical lens is $$\frac{2Ar}{r} = 2A.$$

Thus, for a simple co-axial lens with a spherical wavefront, with paraxial assumptions, $P_C=P_S$, as stated above.

The radial curvature power is defined herein as the curvature power in a direction extending radially outward from the optical axis of the lens. The circumferential curvature power is defined herein as the curvature power at a constant radial coordinate, extending around the circumference of the lens.

The radial sagittal power is defined herein as the sagittal power in a direction extending radially outward from the optical axis of the lens. The circumferential sagittal power is defined herein as the sagittal power at a constant radial coordinate, extending around the circumference of the lens.

While the values of sagittal power and curvature power can be identical or similar for low aberration optics (e.g. single-vision lenses), the sagittal and the curvature powers can be very different for some recently developed myopia-control lenses that employ "non-coaxial optics". These lenses have surface regions that focus light from an on-axis source onto regions displaced from the optical axis, so that the distance at which the local ray bundles come to a focus can be very different from the distance at which they cross the optical axis of the larger, composite lens. For these types of lenses, the distinction between sagittal (axial) and curvature (local) power becomes important. With non-coaxial optics, i.e. where at least some focusing regions form a focal point not on the optical axis of the lens, a description of the curvature power alone or the sagittal power alone does not provide a complete description of the optics. Adjacent regions of a lens can have the same curvature power but differing sagittal powers (rays from each region cross the optical axis at different distances from the local focal distance and from each other). For a lens that includes non-coaxial lenslets, for example, the resulting sagittal and curvature power values may differ significantly: a curvature power map of such a lens shows the consistent add power of each lenslet, but a sagittal power map reveals the varying sagittal power of the lenslet with radial distance, i.e. the distance of the point on the lens surface from the optical axis in a direction normal to the optical axis.

For embodiments of the present disclosure, the radial sagittal power of the central portion of the lens as a whole results from the radial sagittal power of the anterior surface of the central portion, and the radial sagittal power of the posterior surface of the central portion.

Similarly, the radial sagittal power of the first annular portion of the lens as a whole results from the radial sagittal power of the anterior surface of the first annular portion, and the radial sagittal power of the posterior surface of the first annular portion.

Similarly, the radial curvature power of the central portion of the lens as a whole results from the radial curvature power of the anterior surface of the central portion, and the radial curvature power of the posterior surface of the central portion.

Similarly, the radial curvature power of the first annular portion of the lens as a whole results from the radial curvature power of the anterior surface of the first annular portion, and the radial curvature power of the posterior surface of the first annular portion.

The central portion of the lens may have a radial curvature power that is the same as the radial sagittal power. This is referred to herein as the base radial curvature power, the base radial sagittal power, or the base radial power. The nominal power of the central portion will correspond to the labelled refractive power of the contact lens as provided on the contact lens packaging (though in practice it may not have the same value). This will be the average sagittal or average curvature power taken across the central region in the radial and circumferential directions. The measured power of the central portion is the directly measured average refractive curvature or sagittal power, taken across the central region in the radial and circumferential directions. This may differ from the nominal power.

For lenses used in the treatment of myopia, the base power will be negative or close to zero, and the central portion will correct for distance vision. The base power may be between 0.5 diopters (D) and −15.0 diopters. The base power may be from −0.25 D to −15.0 D.

The anterior surface of the central portion may have the same radial curvature power as the posterior surface of the central portion. Alternatively, the anterior surface of the central portion may have a different radial curvature power to the posterior surface of the central region. The radial curvature power of the central portion as whole may hereafter be referred to as the base radial curvature power.

The anterior surface of the central portion may have the same radial sagittal power as the posterior surface of the central region. Alternatively, the anterior surface of the central portion may have a different radial sagittal power to the posterior surface of the central region. The radial sagittal power of the central portion as a whole may hereafter be referred to as the base radial sagittal power.

For embodiments of the present disclosure, the radial curvature power of the first annular portion is greater than the base radial curvature power of the central portion. Hereafter, the difference in radial curvature power of the first annular region and the central region may be referred to as a radial curvature add power. The circumferential curvature power of the first annular portion may be the same as the circumferential curvature power of the central portion. The net radial curvature power of the first annular portion will be the sum of the base radial curvature power and the radial curvature add power. For example, a lens having a base radial curvature power of −3.0 D with a first annular portion having a radial curvature add power of +4.0 D, the net radial curvature power of the first annular portion will be +1.0 D.

In embodiments of the present disclosure, both the anterior surface and the posterior surface of the first annular portion will provide a radial curvature add power. The radial curvature add power of the anterior surface may be the same as the radial curvature add power of the posterior surface. The radial curvature add power of the anterior surface may be different to the radial curvature add power of the posterior surface. The surface of the first annular portion that has a centre of curvature on the optical axis may provide a radial curvature add power of between +0.5 D and +4.0 D, preferably between +2.0 D and +3.0 D. The surface of the first annular portion that has a centre of curvature separated by a first distance from the optical axis may provide a radial curvature add power of between +4.0 D and +20.0 D, for example, +10.0 D. The surface of the first annular portion that has a centre of curvature separated by a first distance from the optical axis may provide a greater radial curvature add power than the surface of the first annular portion that has a centre of curvature on the optical axis.

The base curvature power of the lens may be positive, and the first annular portion may have a radial curvature add power that is more positive than the base curvature power. In this case, the add power focal surface will be closer to the lens than the distal focal surface. An on-axis image will not be formed by light passing through the annular portion. A wearer of the lens will therefore need to use the natural accommodation of their eye to bring nearby objects into focus. It may be that the light rays focused by the annular portion do not intersect with the optical axis of the contact lens at all, or not until after they have passed the add power focal surface.

The base curvature power of the lens may be negative, and the first annular portion may have a curvature add power that is less negative than the power of the base region, or the first annular portion may have a positive curvature power. Considering the lens positioned on the cornea, if the curvature add power of the first annular portion is less negative than the base power, an add power focal surface will be more anterior in the eye than the distal focal surface. Considering the lens when it is not positioned on the cornea, if the curvature add power of the first annular portion is positive, an add power focal surface will be on the opposite (image) side of the lens than the distal focal surface (which will be a virtual focal surface on the object side of the lens); if the curvature add power of the first annular portion is negative (but less negative than the base curvature power), a virtual add power focal surface will be further from the lens than a virtual distal focal surface.

The radial curvature add power of the first annular portion of the lens as whole may be between +0.5 D and +20.0 D, preferably between +4.0 D and +10.0 D.

The radial curvature add power of the first annular portion of the lens may have the same value, or the same power profile, along every meridian of the first annular portion, i.e., the radial curvature add power may be constant in a circumferential direction around the first annular portion.

In embodiments of the present disclosure one of the anterior surface and the posterior surface of the first annular portion has a centre of curvature on the optical axis. This surface will have a radial sagittal power that is greater than the radial sagittal power of the central portion of the lens (i.e., this surface will provide a radial sagittal add power). The radial sagittal add power provided by this surface may be approximately constant across the radial width of the first annular portion.

The other of the anterior surface and the posterior surface of the first annular portion has a centre of curvature that is separated by a first distance from the optical axis. This surface of the first annular portion is tilted relative to the central portion of the lens. As used herein, tilting of the first annular portion means radial tilting rather than lateral tilting. Thus, for example, in a radial cross section of the lens, an outer end of an arc defining the surface of the first annular portion may be displaced above or below its position in a corresponding un-tilted annular portion. Correspondingly, in three dimensions, a circumferential boundary (formed by the ends of the radial arcs) of the first annular portion may be displaced above or below its position in a corresponding un-tilted annular portion. Tilting of a surface of the first annular portion relative to the central portion shifts the centre of curvature of that surface to a first distance from the optical axis. Tilting of a surface of the first annular portion relative to the central portion alters the radial sagittal power of the first annular portion, as this is a function of the first derivative of the wavefront. As a result of the tilting, for this surface, the radial sagittal power will vary across the width of the first annular portion.

For the surface of the first annular portion that has a centre of curvature that is separated by a first distance from the optical axis, the degree of tilting may be chosen so that at a point halfway across the radial width of that surface, the radial sagittal power equals the average radial sagittal power of the central portion of the lens.

For the surface of the first annular portion that has a centre of curvature that is separated by a first distance from the optical axis, the average radial sagittal add power across the radial width of that surface may be zero.

Alternatively, the surface of the first annular portion that has a centre of curvature that is separated by a first distance from the optical axis may provide a radial sagittal add power, in addition to being radially tilted relative to the central region. The radial sagittal add power may be between +0.5 and 4.0 D, for example +2.0 D. In this case, both the anterior surface and the posterior surface of the first annular portion provide a radial sagittal add power that is greater than zero across the radial width of the first annular portion.

For the surface of the first annular portion that has a centre of curvature that is separated by a first distance from the optical axis, the degree of tilting may give rise to a radial sagittal power profile that is a ramp function, starting more negative than the radial sagittal power at the outer edge of the central portion, and increasing with increasing radial distance from the optical axis of the lens. The radial sagittal power profile across that surface, from an inner edge of the first annular portion (i.e., an edge closest to the optical axis of the lens) to the outer edge of the first annular portion (i.e., an edge closest to a peripheral region) may be defined by a line having a positive gradient of between about 1.0 D/mm and about 20.0 D/mm, preferably between about 1.0 D/mm and about 6.0 D/mm, or a curve having an average positive gradient of between about 1.0 D/mm and about 20.0 D/mm, preferably between about 1.0 D/mm and about 6.0 D/mm, with the average being taken along the length of the curve.

For the surface of the first annular portion that has a centre of curvature that is separated by a first distance from the optical axis, the radial sagittal power at the inner edge of the first annular portion (i.e., at the edge closest to the central region) may be between 0.1 D and 5.0 D less than the radial sagittal power at the outer edge of the central portion, preferably between about 0.5 D and 2.5 D less than the radial sagittal power at the outer edge of the central portion.

For the surface of the first annular portion that has a centre of curvature that is separated by a first distance from the optical axis, the radial sagittal power at the outermost edge of the first annular portion (i.e., at the edge closest to a peripheral zone) may be between 0.1 D and 5.0 D greater than the radial sagittal power at the outer edge of the central portion preferably between 0.5 D and 2.0 D greater than the radial sagittal power at the outer edge of the central portion.

The radial sagittal power profile for the first annular portion as a whole will provide a radial sagittal add power across the radial width of the first annular portion, and will have a radial sagittal power profile that increases with increasing radial distance from the optical axis. The radial sagittal power profile for the first annular portion as whole, from an inner edge of the first annular portion (i.e., an edge closest to the optical axis of the lens) to the outer edge of the first annular portion (i.e., an edge closest to a peripheral region) may be defined by a line having a positive gradient of between about 0.5 D/mm and about 20.0 D/mm, preferably between about 0.5 D/mm and about 5.0 D/mm, or a curve having an average positive gradient of between about 0.5 D/mm and about 20.0 D/mm, preferably between about 0.5 D/mm and about 5.0 D/mm, with the average being taken along the length of the curve.

As explained above, the surface of the first annular portion that has a centre of curvature that is on the optical axis will provide a radial sagittal add power, which may be approximately constant across the radial width of that surface. The surface of the first annular portion that has a centre of curvature that is separated by a first distance from the optical axis will have a radial sagittal power profile that increases with increasing radial distance from the optical axis. The surface of the first annular portion that has a centre of curvature that is separated by a first distance from the optical axis may have an average radial sagittal power of zero across the radial width of that surface, or may also provide a radial sagittal add power.

The radial sagittal power across the first annular portion of the lens may be less than the radial curvature power across the first annular portion of the lens. The first annular portion as a whole may have an average radial sagittal add power of between +0.5 and +6.0 D, preferably between +2.0 D and +4.0 D, or between +0.5 and +2.0 D. The first annular portion as a whole may have an average radial curvature power of between +4.0 and +24.0 D, preferably between +4.0 D to +12.0 D. The radial curvature power across the radial width of the first annular portion may be approximately constant.

The lens may comprise at least one additional annular portion that is concentric to the first annular portion. Each or any additional annular portion(s) may have any of the features of the first annular portion described above. In a similar manner to the first annular portion, each or any additional annular portions may provide a radial curvature add power, with the radial curvature power of the annular portion(s) being the sum of the radial curvature power of the anterior surface of that portion, and the radial curvature power of the posterior surface of that portion. The radial curvature add power of each additional annular portion may be between +0.0 D and +24.0 D, preferably between +4.0 D and +12.0 D.

For each or any additional annular portion(s), the radial curvature power of one of the anterior or posterior surfaces of the portion(s) may provide a first radial curvature add power, and the other of the anterior or posterior surfaces of the lens may provide a second, different radial curvature add power. Alternatively, for each or any additional annular portions, the anterior surface of the lens and the posterior surface of the portion(s) may provide the same radial curvature add power.

For each or any additional annular portion(s), one of the anterior or posterior surfaces of the lens may have a centre of curvature that is on the optical axis. This surface may have a radial sagittal power that is greater than the radial sagittal power of the central portion of the lens (i.e., the surface may provide a radial sagittal add power). The radial sagittal add power may be approximately constant across the radial width of that surface.

For each or any additional annular portion(s), the other of the anterior surface and the posterior surface of the portion(s) may have a centre of curvature that is separated by a distance from the optical axis, and may be radially tilted relative to the central portion. As a result of the tilting, a surface of each or any additional annular portions that has a centre of curvature that is separated by a distance from the optical axis may have a radial sagittal power profile that increases with increasing radial distance from the optical axis. The gradient of the radial sagittal power profile across that surface may be between about 1.0 D/mm and about 20.0 D/mm, preferably between about 1.0 D/mm and 4.0 D/mm. The degree of tilting may be chosen so that at a point halfway across the radial width of that surface for, the radial sagittal power equals the average radial sagittal power of the central portion of the lens.

For each or any additional annular portion(s), a surface that is radially tilted may be tilted relative to the central portion by the same amount as the first annular portion, or by a different amount to the first annular portion. Tilting of a surface of an annular portion relative to the central portion shifts the centre of curvature of that surface away from the optical axis. The centre of curvature of each or any additional annular portion may be shifted away from the optical axis by the same first distance as the centre of curvature of the first annular portion. Alternatively, the centre of curvature of each or any additional annular portions may be shifted away from the optical axis by a different distance to the centre of curvature of the first annular portion.

The radial sagittal power profile of each or any additional annular portion(s) may be dependent upon the radial position of that annular portion. An annular portion at a greater radial distance from the optical axis may have a greater radial sagittal power gradient, or a smaller radial sagittal power gradient, than the first annular portion. A first annular portion may have a radial sagittal power profile that increases with increasing radial distance from the optical axis with a first gradient, and a second annular portion may have a radial sagittal power profile that increases with increasing radial distance from the optical axis with a second gradient that is smaller than the first gradient. The first gradient may be between 0.5 D/mm and about 20.0 D/mm, preferably between about 0.5 D/mm and 5.0 D/mm. The second gradient may be between 0.5 D/mm and about 20.0 D/mm, preferably between about 0.5 D/mm and 3.0 D/mm.

In between the first annular portion and each or any additional annular portion(s), the radial curvature power of the lens may be less than the radial curvature power of the first annular portion. Regions of the lens in between concentric annular portions may hereafter be referred to as distance power portions. The lens may comprise a plurality of concentric additional annular portions, wherein the additional annular portions are separated by distance portions having the base radial curvature power.

The contact lens may be a toric contact lens. For example, the toric contact lens may include an optic zone shaped to correct for a person's astigmatism.

The contact lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like.

By way of example, the lens may comprise a hydrogel or silicone hydrogel contact lens having a lens diameter of between 13 and 15 mm.

According to a second aspect, the present disclosure provides a method of manufacturing a contact lens. The method comprises forming a contact lens, wherein the lens comprises an optic zone. The optic zone comprises a central portion having a centre of curvature that is on an optical axis, and a first annular portion extending radially outwards from the central portion. The first annular portion provides a radial curvature add power. One of an anterior surface and a posterior surface of the first annular portion has a centre of curvature that is on the optical axis. The other of the anterior surface and the posterior surface of the first annular portion has a centre of curvature that is separated by a first distance from the optical axis.

The lens may include any of the features set out in respect of the first aspect above.

The method of manufacturing the lens may comprise tilting the annular portion of one of the lens surfaces relative to the central portion, such that the centre of curvature of that surface is separated by a first distance from the optical axis. In practice, tilting may comprise incorporating a tilt into the optical design of the anterior or posterior lens surface of the first annular portion of the lens.

The method of manufacturing may comprise providing a female mold member with a concave lens forming surface and a male mold member with a convex lens forming surface. One of the concave and convex lens forming surfaces is configured to produce a first annular region that has a centre of curvature that is separated by a first distance from the optical axis of the lens. This surface will be radially tilted relative the central region. The other of the concave and convex lens forming surfaces is configured to produce a surface of a first annular portion that is on the optical axis of the lens. The method may comprise using the female and male mold members to form the lens. The method may comprise filling a gap between the female and male mold members with bulk lens material. The method may further comprise curing the bulk lens material to forms the lens.

The method may include a step of cast moulding the contact lens by causing polymerisation of a contact lens formulation located between the female mould member and the male mould member of a contact lens mould assembly. Alternatively, the method may comprise a step of lathing a surface of the contact lens. For example, one or both surface(s) of the contact lens may be cut using a lathe to provide the desired optical properties.

The contact lens may be a molded contact lens. The lens can be formed by cast molding processes, spin cast molding processes, or lathing processes, or a combination thereof. As understood by persons skilled in the art, cast molding refers to the molding of a lens by placing a lens forming material between a female mold member having a concave lens member forming surface, and a male mold member having a convex lens member forming surface.

In a third aspect of the disclosure there is also provided a method of using the contact lens described herein. The methods may be effective in reducing progression of a refractive error, such as reducing the progression of myopia. When the present lenses are used to reduce the progression of myopia, the methods include a step of providing the contact lenses to a person whose eyes are able to accommodate for varying near distances (e.g., in a range of from about 15 cm to about 40 cm). Some embodiments of the methods include a step of providing the ophthalmic lenses to a person that is from about 5 years old to about 25 years old. The providing can be performed by an eye care practitioner, such as an optician or optometrist. Alternatively, the providing can be performed by a lens distributor that arranges for the delivery of the ophthalmic lenses to the lens wearer.

Figures 2A, 2B, 2C:
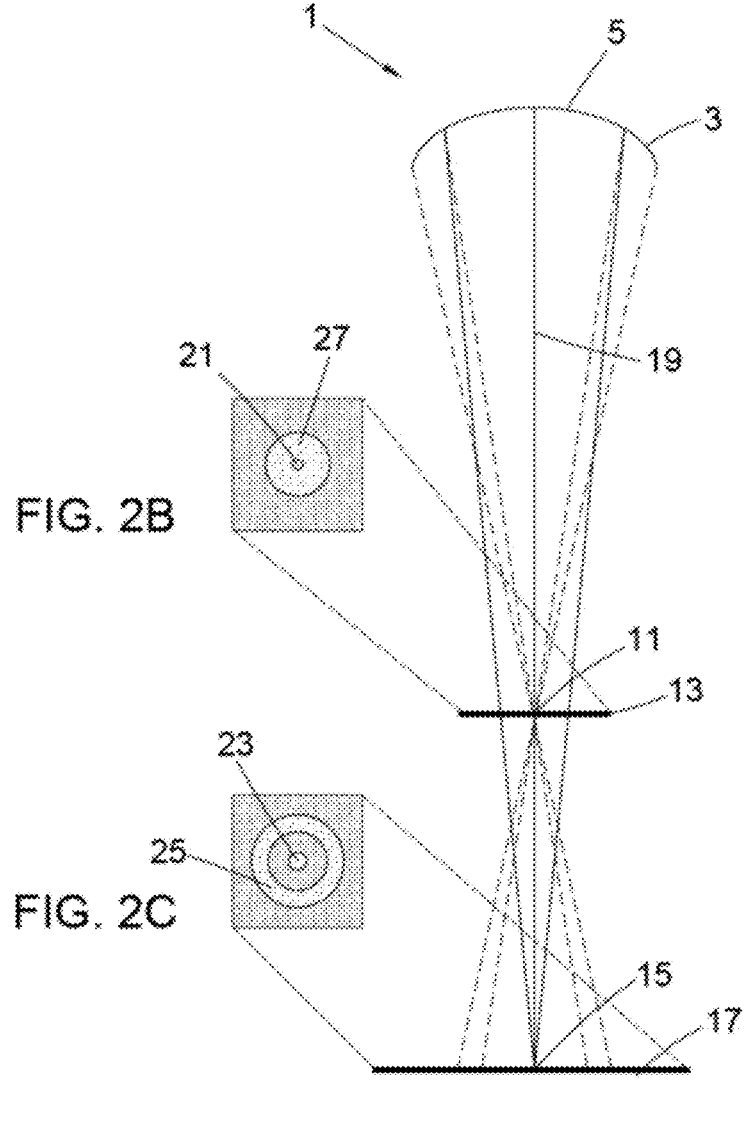
FIG. 2A is a ray diagram for the lens surface of FIG. 1A.
FIG. 2B shows a light pattern at a proximal focal surface of the lens surface of FIG. 1A formed from a distant point source.
FIG. 2C shows a light pattern at a distal focal surface of the lens surface of FIG. 1A formed from a distant point source.
Figure 3:
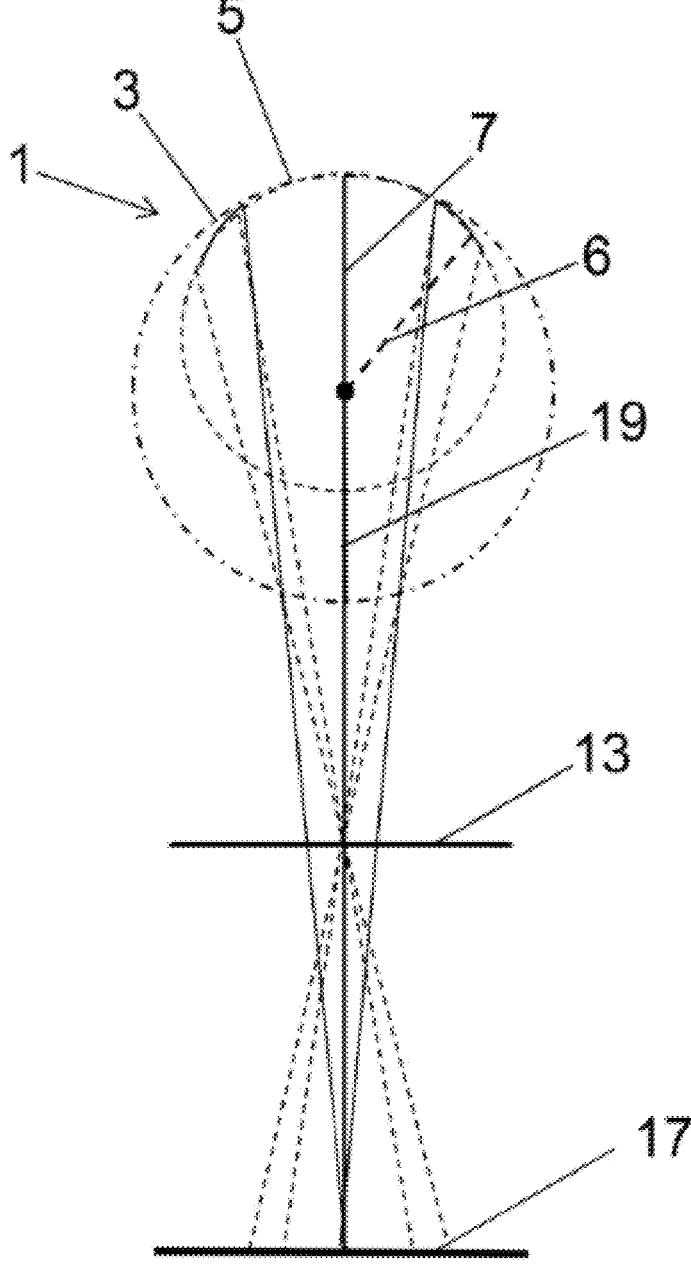
FIG. 3 is a partial ray diagram for the lens surface of FIGS. 1A and 1B together with circles indicating the radii of curvature of the central distance region (dashed-dotted line) and the annular add region (dashed line) of the contact lens.

FIG. 1A shows a schematic top view of a lens surface 1 of a contact lens according to an embodiment of the present disclosure. For contact lens according to embodiments of the present disclosure this lens surface 1 may be the anterior or posterior surface of the contact lens. FIG. 1B shows a schematic side view of the lens surface 1 of FIG. 1A. The surface 1 comprises an optic zone 2, which approximately covers the pupil, and a peripheral zone 4 that sits over the iris. The peripheral zone 4 provides mechanical functions, including increasing the size of the contact lens thereby making the lens easier to handle, providing ballasting to prevent rotation of the contact lens, and providing a shaped region that improves comfort for the contact lens wearer. The optic zone 2 provides the optical functionality, and the optic zone comprises an annular region 3 and a central region 5. The contact has a base radial curvature power, which is equal to the base radial sagittal power. The base power results from the radius of curvature of the central region 5. The centre of curvature of the central region 5 lies on a first optical axis 19 (shown in FIG. 2A). The annular region 3 has a greater radial curvature power than the base radial curvature power. The annular region 3 radial curvature power is provided by a radius of curvature 6 of the annular region 3, which is smaller than the radius of curvature 7 of the central region 5, as shown in FIG. 3. The centre of curvature of the annular region 3 lies on the first optical axis 19. The annular region 3 has a greater power than the central region 5. As shown in FIG. 2A, the focus 11 of the annular region 3 and the focus 15 of the central region 5 share a common optical axis 19. The focus 11 of the annular region 3 lies on a proximal focal surface 13, and the focus for the central region 5 lies on a distal focal surface 17, which is further away from the posterior surface of the lens. As shown in FIG. 2C, for a point source at infinity, light rays focused by the central region 5 form a focused image 23 at the distal focal surface 17. Light rays focused by the central region 5 also produce an unfocused blur spot 27 at the proximal focal surface 13.

As shown in FIG. 2B, light rays focused by the annular region 3 form a focused image 21 at the proximal focal surface 13. Light rays focused by the annular region 3 diverge after the proximal focal surface 13, and the diverging light rays produce an unfocused annulus 25 at the distal focal surface 17. As discussed above, the unfocused annulus image 25 may result in wearers of a contact lens having this lens surface 1 seeing a 'halo' around focused distance images.

Figure 4A:
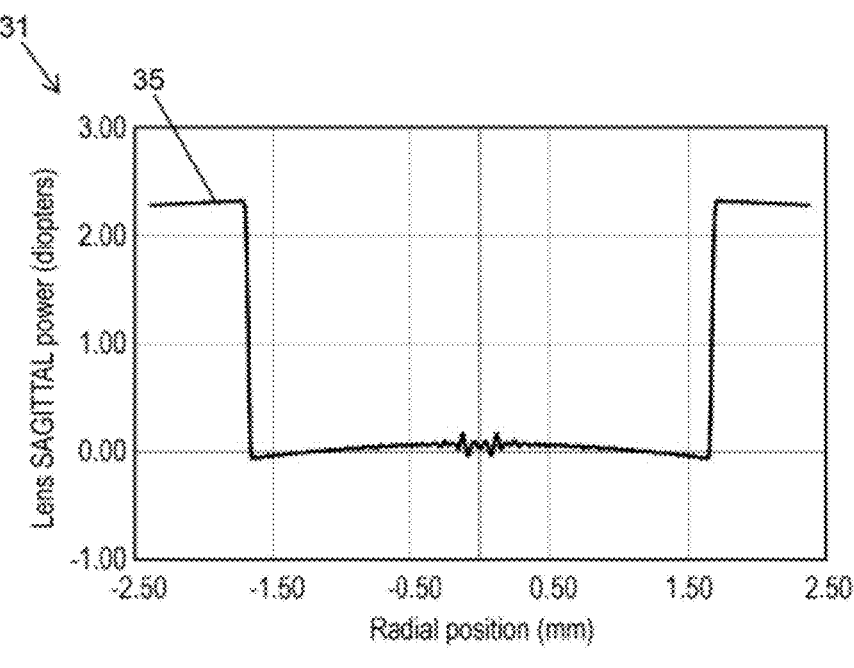
FIG. 4A is a plot showing the variation in radial sagittal power for the lens surface shown in FIGS. 1A and 1B.
Figure 4B:
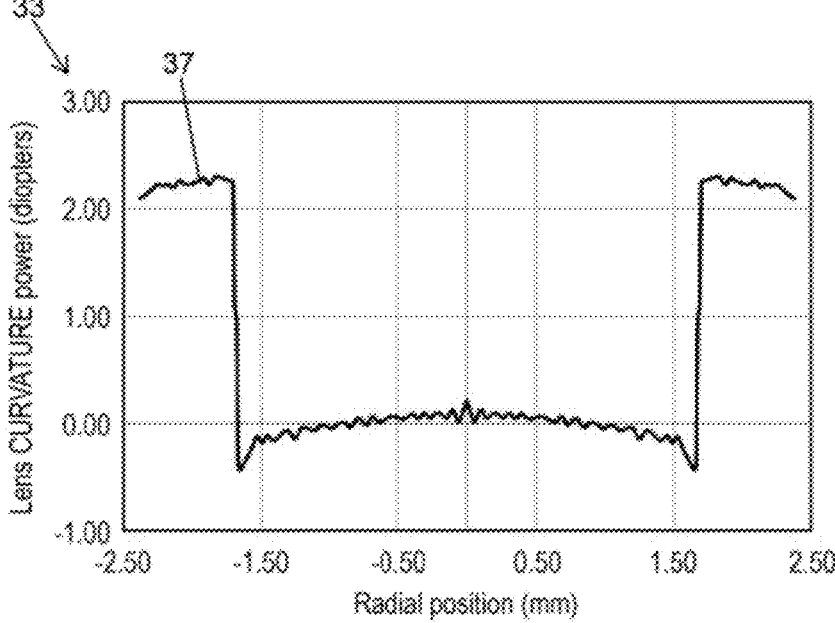
FIG. 4B is a plot showing the variation in radial curvature power for the lens surface shown in FIGS. 1A and 1B.

FIG. 4A is a plot 31 showing the variation in radial sagittal power for the lens surface 1 shown in FIGS. 1A and 1B, and FIG. 4B is a plot 33 showing the variation in radial curvature power for the lens surface 1 shown in FIGS. 1A and 1B. FIGS. 4A and 4B show power variations along a radial diameter of the lens surface 1. For this lens surface 1, as the annular region 3 has an on-axis centre of curvature and provides a radial sagittal add power, the radial sagittal power (indicated by curve 35) is greater across the annular region 3 than across the central region 5, and the radial sagittal power is approximately constant across the radial width of the annular region 3. The radial curvature power (indicated by curve 37) is also greater across the annular region 3 than across the central region 5, and the radial curvature power is approximately constant across the radial width of the annular region 3.

Figures 5A, 5B:
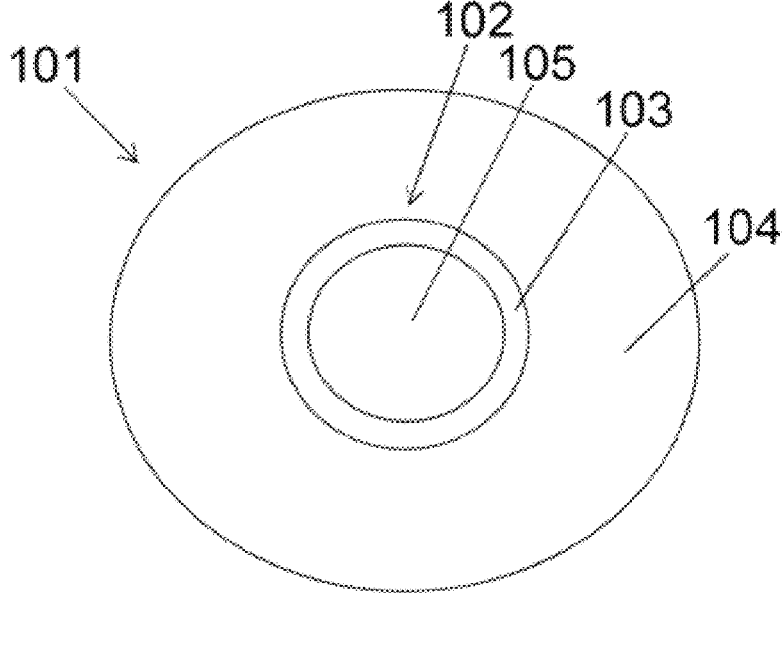
FIG. 5A is a schematic top view of a surface of a contact lens according to an embodiment of the present disclosure having non-coaxial optics.
FIG. 5B is a side view of the lens surface of FIG. 5A.

FIG. 5A shows a schematic top view of another lens surface 101 of a contact lens according to embodiments of the present disclosure, this lens surface 101 having non-coaxial optics. For contact lens according to embodiments of the present disclosure, this lens surface 101 may be the anterior or posterior surface of the contact lens 101. FIG. 5B is a schematic side view of the lens surface 101 of FIG. 5A. Similar to the lens surface 1 of FIG. 1A, the lens surface 101 comprises an optic zone 102, which approximately covers the pupil, and a peripheral zone 104 that sits over the iris.

Figures 6A, 6B, 6C:
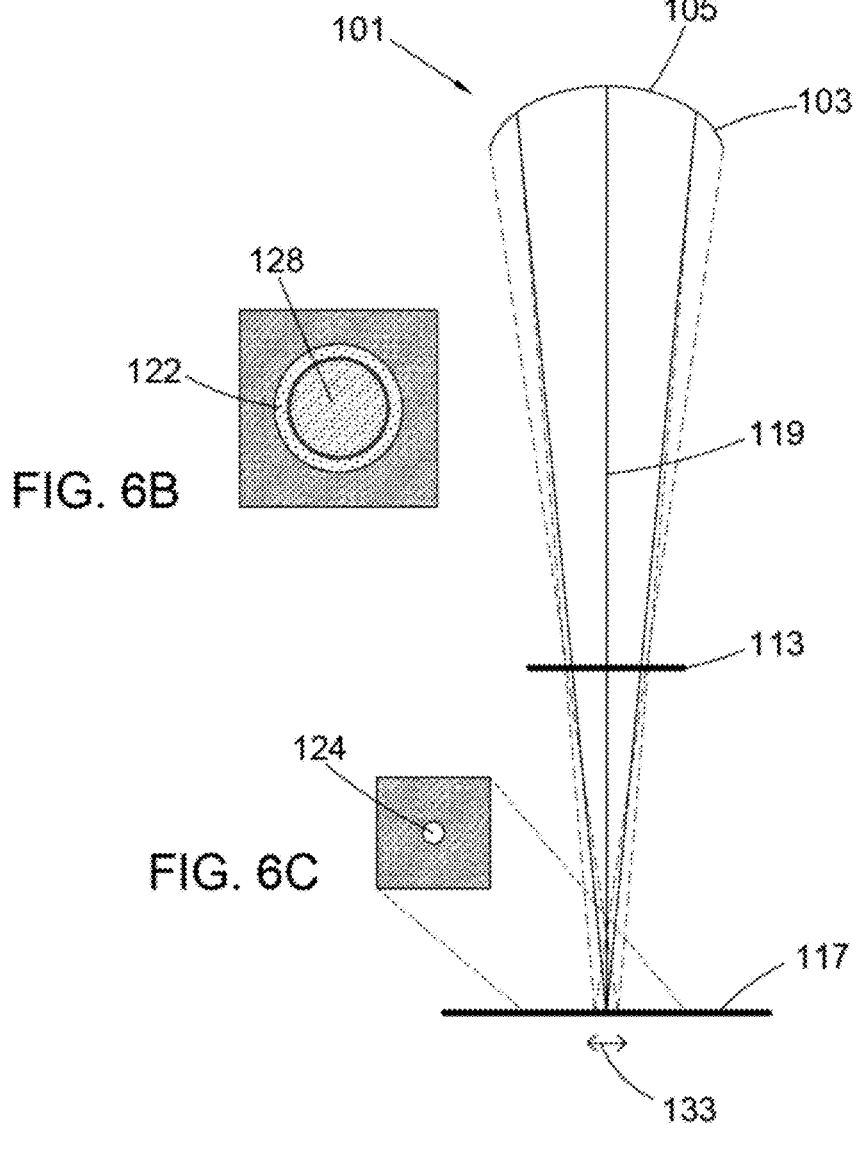
FIG. 6A is a ray diagram for the lens surface of FIGS. 5A and 5B.
FIG. 6B shows a light pattern at a proximal focal surface for the lens surface of FIGS. 5A and 5B formed from a distant point source.
FIG. 6C shows a light pattern at a distal focal surface for the lens surface of FIGS. 5A and 5B formed from a distant point source.
Figure 6D:
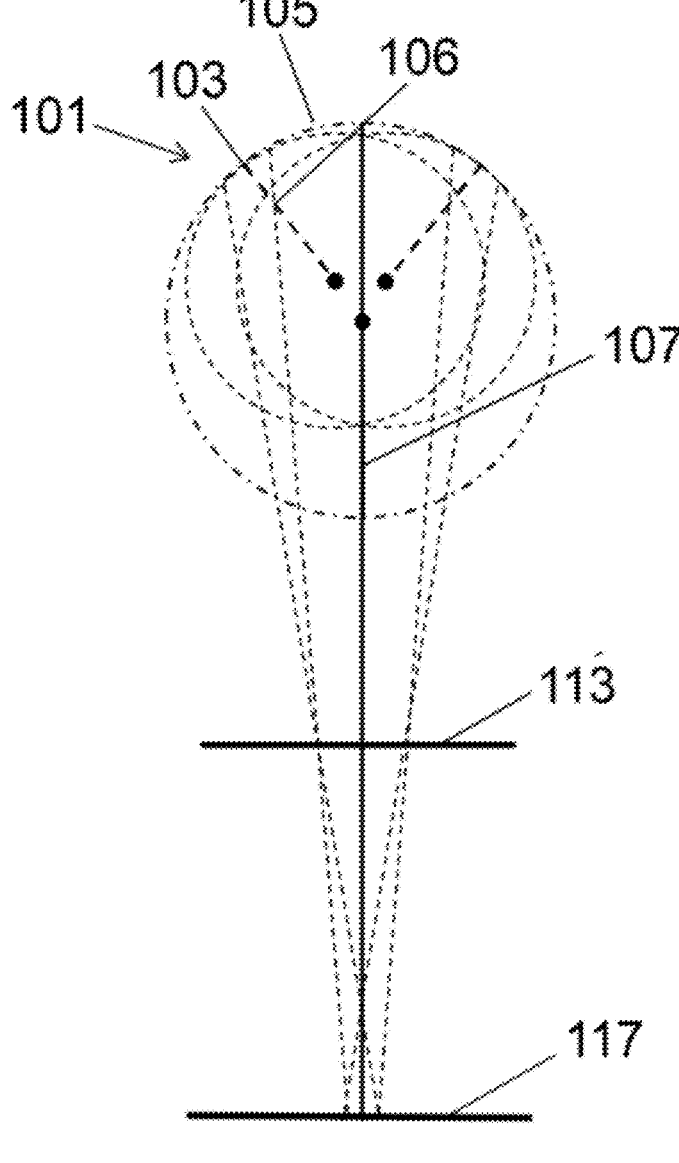
FIG. 6D is a partial ray diagram for the lens surface of FIGS. 5A and 5B together with circles indicating the radii of curvature of the central distance region (dashed-dotted line) and the annular add region (dashed line) of the lens surface.

The peripheral zone 104 provides mechanical functions, including increasing the size of the contact lens thereby making the lens 101 easier to handle, providing ballasting to prevent rotation of the contact lens 101, and providing a shaped region that improves comfort for the contact lens 101 wearer. The optic zone 102 provides the optical functionality, and the optic zone comprises an annular region 103 and a central region 105. The lens surface 101 has a base radial curvature power, which is equal to the base radial sagittal power. The base power results from a radius of curvature of the lens surface 101. The centre of curvature of the central region 105 lies on a first optical axis 119 (shown in FIG. 6A). The annular region 103 has a greater radial curvature power than the base radial curvature power. The annular region 103 radial curvature power is provided by a radius of curvature of the annular region 103, which is smaller than the radius of curvature of the central region 105. However, in contrast to the lens surface 1 of FIGS. 1A and 1B, for the lens 101 shown in FIGS. 5A and 5B, the curvature of the annular region 103 cannot be defined by a single sphere, and a centre of curvature of the annular region 103 does not lie on the first optical axis 119. This is shown in FIG. 6D. The annular region 103 is tilted relatively to the central region 105, so that the outer edge of the annular region 103 is higher (in FIG. 5B) relative to its inner edge than is the case in the lens surface 1 of FIGS. 1A and 1B, which alters the radial sagittal power of the annular region 103, but does not alter the radial curvature power of the annular region 103. As shown in FIG. 6D, the central region 105 defines a portion of a surface of a sphere of larger radius 107. The annular region 103 defines a curved annular surface with smaller radius 106.

At the distal focal surface 117, light rays passing through the central region 105 are focused. The annular region 103 acts as an optical beam stop, which leads to a small spot size 133 of light 124 at the distal focal surface 117, as shown in FIG. 6C.

A single image is not formed at the proximal focal surface 113. As shown in FIG. 6B, at the proximal focal surface 113, for a point source at infinity, light rays passing through the central region 105 generate a blur circle 128, as does the lens of FIGS. 1A, 1B and 2A, 2B. However, light rays from a distant point source passing through the annular region 103 generate a focused annulus 122, as shown in FIG. 6B, which surrounds the blur circle 128. FIG. 6B shows the light pattern generated for a distant point source. In contrast to the lens surface 1 of FIGS. 1A and 1B, the lens surface 101 of FIGS. 5A and 5B does not generate a single image or an on-axis image at the proximal focal surface 113 that could be used to avoid the need for the eye to accommodate for near objects. For an extended object at distance, the focused image formed at the proximal focal surface 113 is a convolution of (i) the focused image of the extended object that would be obtained with a conventional lens having the optical power of the annular region 103 and (ii) an optical transfer function representing the optical effect of the annular region 103.

In contrast to the lens 1 of FIGS. 1A and 1B, an annulus or 'halo' effect does not occur at the distal focal surface 117.

Figure 7A:
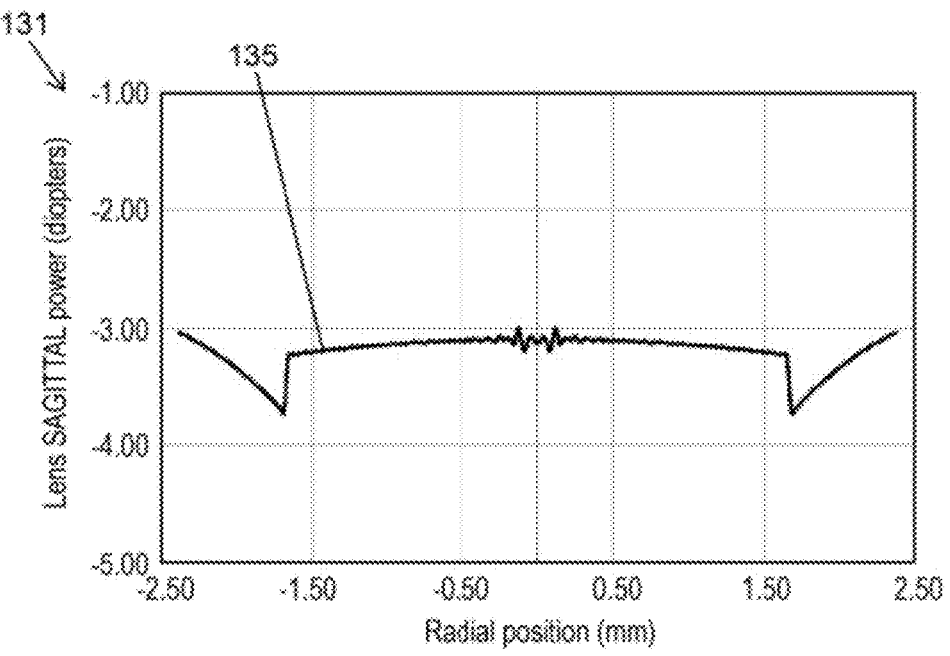
FIG. 7A is a plot showing the variation in radial sagittal power for the lens surface shown in FIGS. 5A and 5B.
Figure 7B:
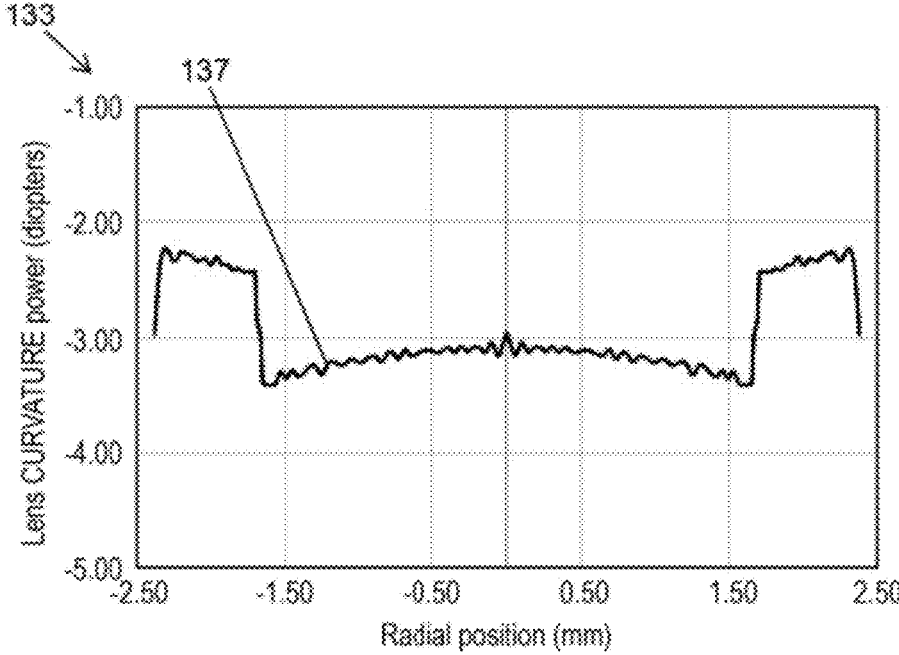
FIG. 7B is a plot showing the variation in radial curvature power for the lens surface shown in FIGS. 5A and 5B.

FIG. 7A is a plot 131 showing the variation in radial sagittal power for the lens surface 101 shown in FIGS. 5A and 5B, and FIG. 7B is a plot 133 showing the variation in radial curvature based power for the lens shown in FIGS. 5A and 5B. FIGS. 7A and 7B show power variations along a radial diameter of the lens surface 101. For this lens 101, the annular region 103 provides a radial curvature add power, and the radial curvature power (indicated by curve 137) is greater across the annular region 103 than across the central region 105. However, the annular region 103 is tilted relative to the central region 105, such that the annular region 103 has an off-axis centre of curvature. The tilt of the annular region 103 relative to the central region 105 means that in the radial sagittal power is more negative than the radial sagittal power of the central region at the boundary between the central region 105 and the annular region 105, as shown by the curve 135. The radial sagittal power may increase with increasing radial distance towards the outer edge of the annular region 103.

In embodiments of the present disclosure the contact lens comprises an optic zone, the optic zone comprising a central portion having a centre of curvature that is on an optical axis and an annular portion extending radially outwards from the central portion. The lens has an anterior surface and a posterior surface. One of an anterior surface and a posterior surface of the first annular portion has a centre of curvature that is on the optical axis, and the other of the anterior surface and the posterior surface of the first annular portion has a centre of curvature that is separated by a first distance from the optical axis.

In embodiments of the present disclosure, the lens surface that has an annular region having a centre of curvature that is on the optical axis focuses may be a lens surface 1 as shown and described in FIGS. 1A to 4D.

The lens surface that has an annular region having a centre of curvature that is separated by a first distance from the optical axis may be a lens surface 101 as shown and described in FIGS. 5A-7D.

Figure 8A:
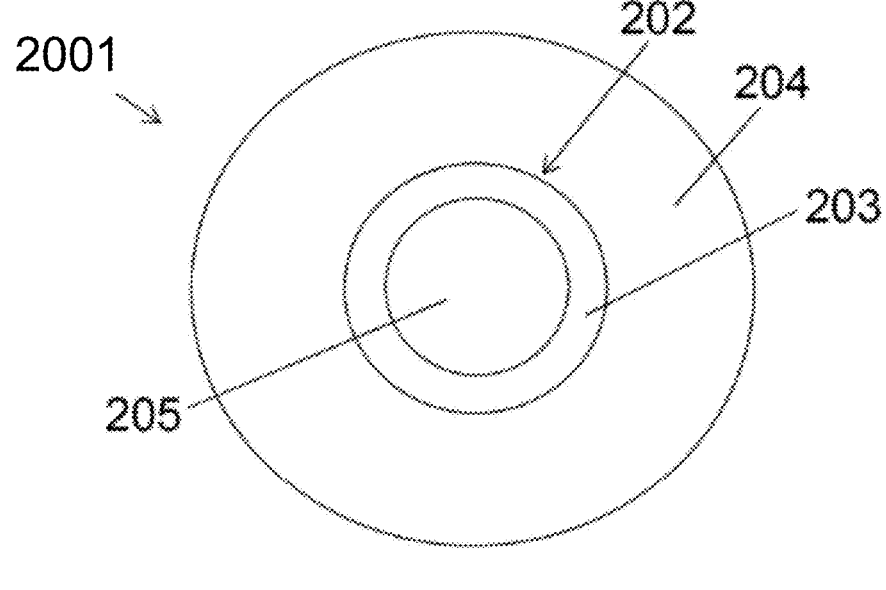
FIG. 8A is a top view of a contact lens according to an embodiment of the present disclosure.

FIG. 8A shows a schematic top view of a contact lens 2001 according to an embodiment of the present disclosure. The lens 2001 comprises an anterior lens surface (not shown), which is similar to the lens surface 1 shown and described in FIGS. 1A-4D, and a posterior lens surface (not shown), which is similar to the lens surface 101 shown and described in FIGS. 5A-7B. The anterior lens surface and posterior lens surface are aligned such that they share a common optical axis 219.

The lens 2001 comprises an optic zone 202, which approximately covers the pupil, and a peripheral zone 204 that sits over the iris. The peripheral zone 204 provides mechanical functions, including increasing the size of the lens thereby making the lens 2001 easier to handle, providing ballasting to prevent rotation of the lens 2001, and providing a shaped region that improves comfort for the lens 2001 wearer. The optic zone 202 provides the optical functionality of the lens 2001, and the optic zone comprises an annular portion 203 and a central portion 205. The central portion 205 of the lens 2001 has a base radial curvature power, which is equal to the base radial sagittal power. In this example embodiment of the present disclosure, the base radial curvature power of the central portion is 0.0 D, which is equal to the base radial sagittal power of the central portion 205. This base power results from the curvatures of the anterior surface and the posterior surface of the lens 2001, with the base radial curvature power of the central portion 205 being the sum of the radial curvature power of the anterior surface of the central portion 205 and the radial curvature power of the posterior surface of the central portion 205. The centre of curvature 244 of the central portion 205 lies on a first optical axis 219 (shown in FIG. 9). The annular portion 203 has a greater radial curvature power than the base radial curvature power, i.e., the annular portion 203 provides a radial curvature add power. The radial curvature power of the annular portion 203 as a whole results from the radius of curvature of the anterior surface of the annular portion, and the radius of curvature of the posterior surface of the annular portion 205, with the radial curvature power of the annular portion 203 being the sum of the radial curvature power of the anterior surface of the annular portion 203 and the radial curvature power of the posterior surface of the annular portion 203. In this embodiment, the radial curvature power of the posterior surface of the lens is +2 D, and the radial curvature power of the anterior surface of the lens is +1.5 D. At a distal focal plane 217, light rays passing through the central region 205 are focused. Light rays passing through the annular region 203 are directed towards a sagittal add focal plane 218.

The anterior surface of the annular portion 205 also provides a radial sagittal add power of about 2.0 D. Across the radial width of the anterior surface of the annular portion 205, the radial sagittal power profile is approximately constant.

Figure 9:
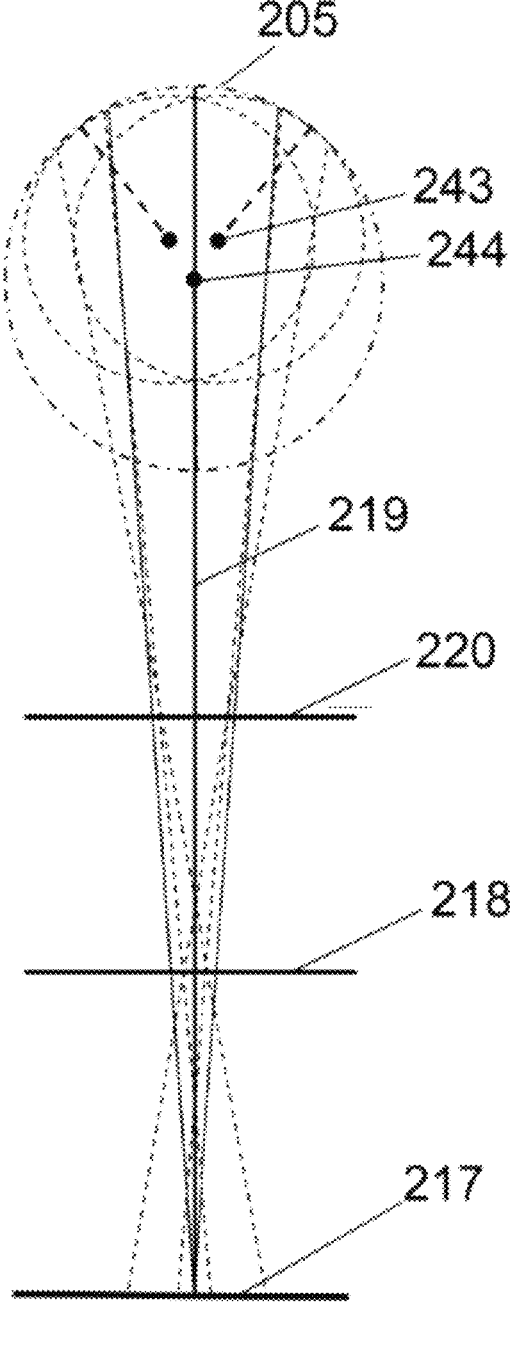
FIG. 9 is a partial ray diagram for the lens of FIGS. 8A and 8B together with circles indicating the radii of curvature of the central distance region (dashed-dotted line) and the annular add region (dashed line) of the contact lens.

The posterior surface of the annular portion 203 is radially tilted relative to the central portion 205 so that a centre of curvature 243 of the posterior surface of the annular portion 203 is offset from the first optical axis 219. This is shown in FIG. 9. Tilting the posterior surface of the annular portion 203 relative to the central portion 205 reduces the radial sagittal power at the boundary between the central portion 205 and the annular portion 203. Considering only the posterior surface of the annular portion 203, across the radial width of the annular portion 203 the average radial sagittal add power is zero, and across the radial width, the radial sagittal power increases with a linear gradient of 1 D/mm.

Figure 8B:
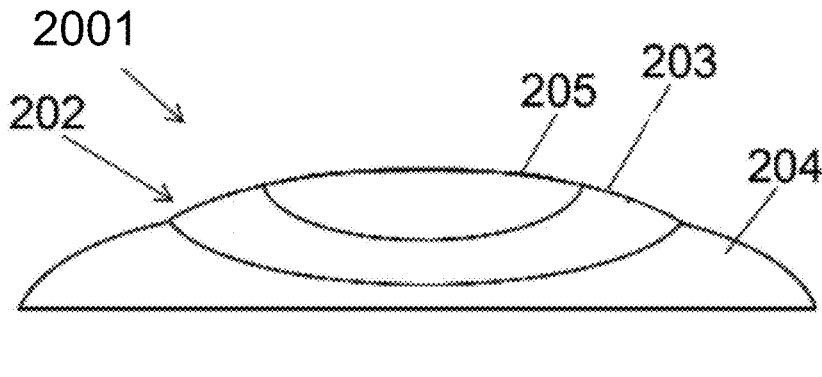
FIG. 8B is a side view of the contact lens of FIG. 8A.
Figure 10A:
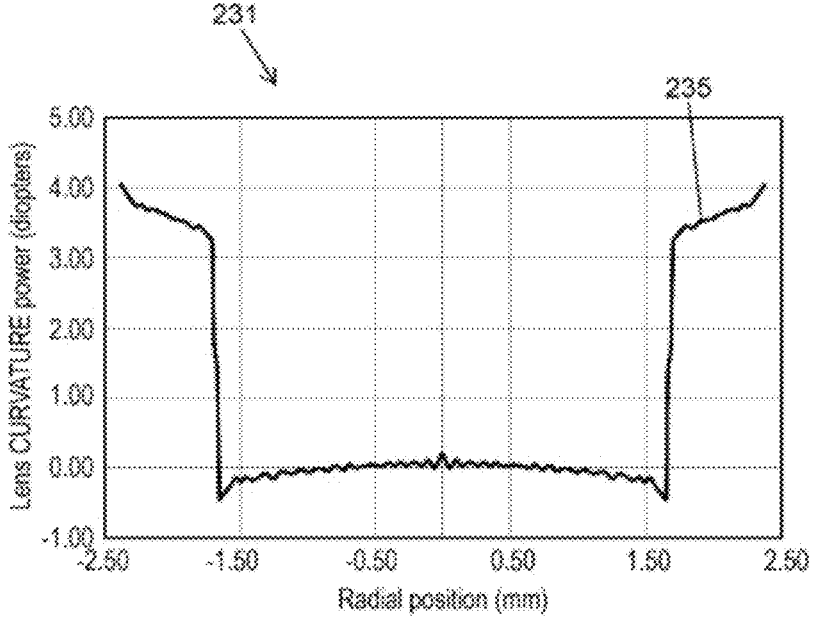
FIG. 10A is a plot showing the variation in radial curvature power for the lens shown in FIGS. 8A and 8B.

FIG. 10A is a plot 231 showing the variation in radial curvature power across a radial diameter of the lens 2001 shown in FIGS. 8A and 8B. This plot 231 shows the average of the radial and circumferential curvature power for the lens 2001 as a whole, summing powers of the anterior and posterior lens surfaces. Across the central portion 205, the curvature power of the lens 2001 is constant, and approximately zero. At the boundary between the central portion 205 and the annular portion 203, the curvature power shows a sharp increase, as indicated by the curve 235. This is due to the radial curvature add power of the anterior surface of the lens 201 and the radial curvature add power of the posterior surface of the lens 201. The circumferential curvature power will not change significantly at the boundary between the central portion 205 and the annular portion 203, but the radial curvature power will increase, and thus the average curvature power (indicated by the curve 235) will increase at the boundary between the central portion 205, to an average of the circumferential curvature power and the radial curvature power.

Figure 10B:
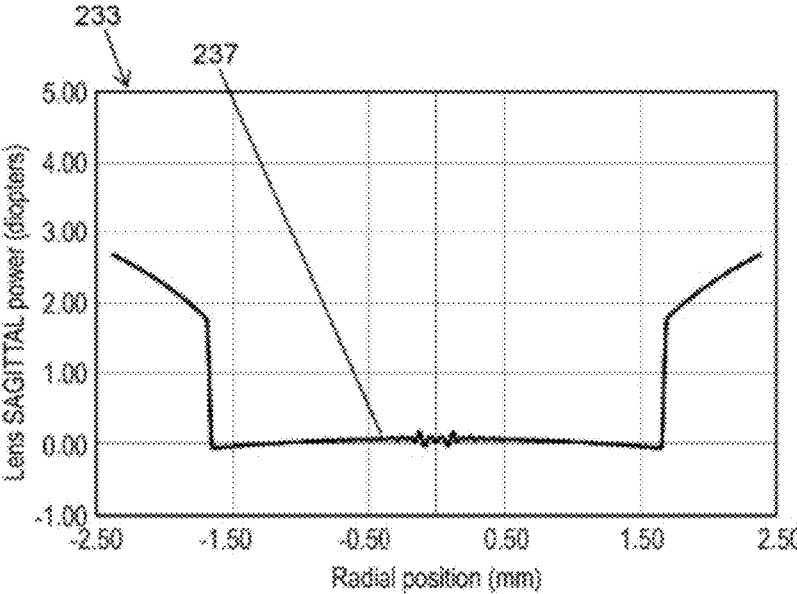
FIG. 10B is a plot showing the variation in radial sagittal power for the lens shown in FIGS. 8A and 8B.

FIG. 10B is a plot 233 showing the variation in sagittal power across a radial diameter of the lens 2001 shown in FIGS. 8A and 8B. This plot 233 shows the average of the radial and circumferential sagittal power for the lens 201 as a whole, summing the powers of the anterior and posterior lens surfaces. Across the central portion 205 of the lens 2001, the sagittal power is constant and has a value of 0.0 D. At the boundary between the central portion 205 and the annular portion 203, the sagittal power of the annular portion 203 increases sharply, as indicated by the curve 237, due to the radial sagittal add power of the anterior surface of the annular portion 203. The radial sagittal power increases extending radially outwards across the width of the annular portion 203, in an approximately linear manner, as a result of the radial tilting of the posterior surface of the annular portion. The radial sagittal power profile across the annular portion 203 as a whole is the combination of the radial sagittal add power of the anterior surface of the annular portion 203 (which has a profile similar to that of the lens surface 1 shown in FIG. 4A) and of the posterior surface of the annular portion 203 (which results in a profile similar to that of the lens surface 101 shown in FIG. 7A).

Figures 11A, 11B, 11C, 11D:
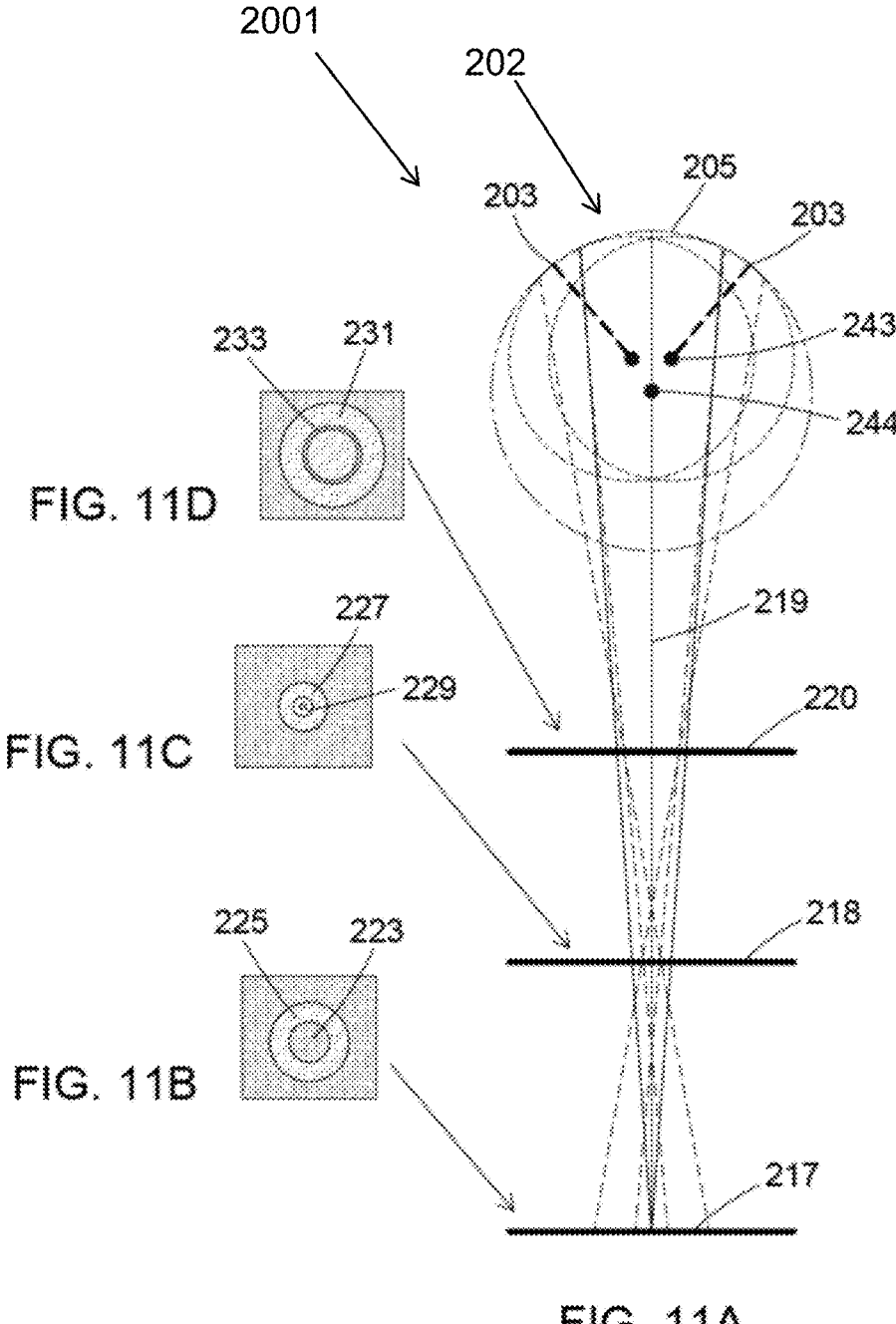
FIG. 11A is a ray diagram for the lens of FIGS. 8A and 8B
FIG. 11B shows a light pattern at a distal focal surface for the lens surface of FIGS. 8A and 8B formed from a distant point source.
FIG. 11C shows a light pattern at a first proximal focal surface for the lens surface of FIGS. 8A and 8B formed from a distant point source.
FIG. 11D shows a light pattern at a second proximal focal surface for the lens surface of FIGS. 8A and 8B formed from a distant point source.

As shown in FIG. 11A, for the lens 2001 shown in FIGS. 8A and 8B, and considering the lens as a whole (i.e., the posterior and anterior surfaces of the lens 203) at a distal focal surface 217, light rays passing through the central portion 205 will form a focused image 223, as shown in FIG. 11B. Light rays passing through the annular portion 203 will produce an unfocused annulus 225 at the distal focal surface 217. At a first proximal focal surface 218, for a point source at infinity, light rays passing through the central portion 205 will generate a first blur circle 227 and light rays passing through the annular portion 203 will generate a second blur circle 229, as shown in FIG. 11C. At a second proximal focal surface 220, light rays passing through the central portion 205 will generate a third blur circle 231 and light rays passing through the annular portion 203 will generate a focused annulus 233 lying within the third blur circle 231, as shown in FIG. 11D.

In the embodiment of the present disclosure shown and described in FIGS. 8A-11D, the lens has one annular portion. In other embodiments (not shown), the lens will have a plurality of concentric annular portions.

In the embodiment of the present disclosure shown and described in FIGS. 8A-11D, the posterior surface of the annular portion has a centre of curvature that is separated by a first distance from an optical axis of the lens, and the anterior surface of the annular portion has a centre of curvature that is on the optical axis of the lens. In other embodiments (not shown), the anterior and posterior surface of the lens may be reversed, such that the anterior surface of the annular portion has a centre of curvature that is separated by a first distance from an optical axis of the lens, and the posterior surface of the annular portion has a centre of curvature that is on the optical axis of the lens.

In the embodiment of the present disclosure shown and described in FIGS. 8A-11D, the posterior surface of the annular portion is radially tilted relative to the central portion, and the average radial sagittal power across the radial width of the posterior surface of the annular portion is zero, i.e., on average, across the radial width, the posterior surface of the annular portion does not provide a radial sagittal add power. In other embodiments of the present disclosure (not shown), both the posterior and annular surfaces of the annular portion will provide a radial sagittal add power, with one of the posterior and anterior surfaces of the annular region being radially tilted relative to the central portion. In these embodiments, the radial sagittal power across the width of the annular portion will be the sum of the radial sagittal power of the anterior surface of the annular portion and the radial sagittal power of the posterior surface of the annular portion.

Figure 12:
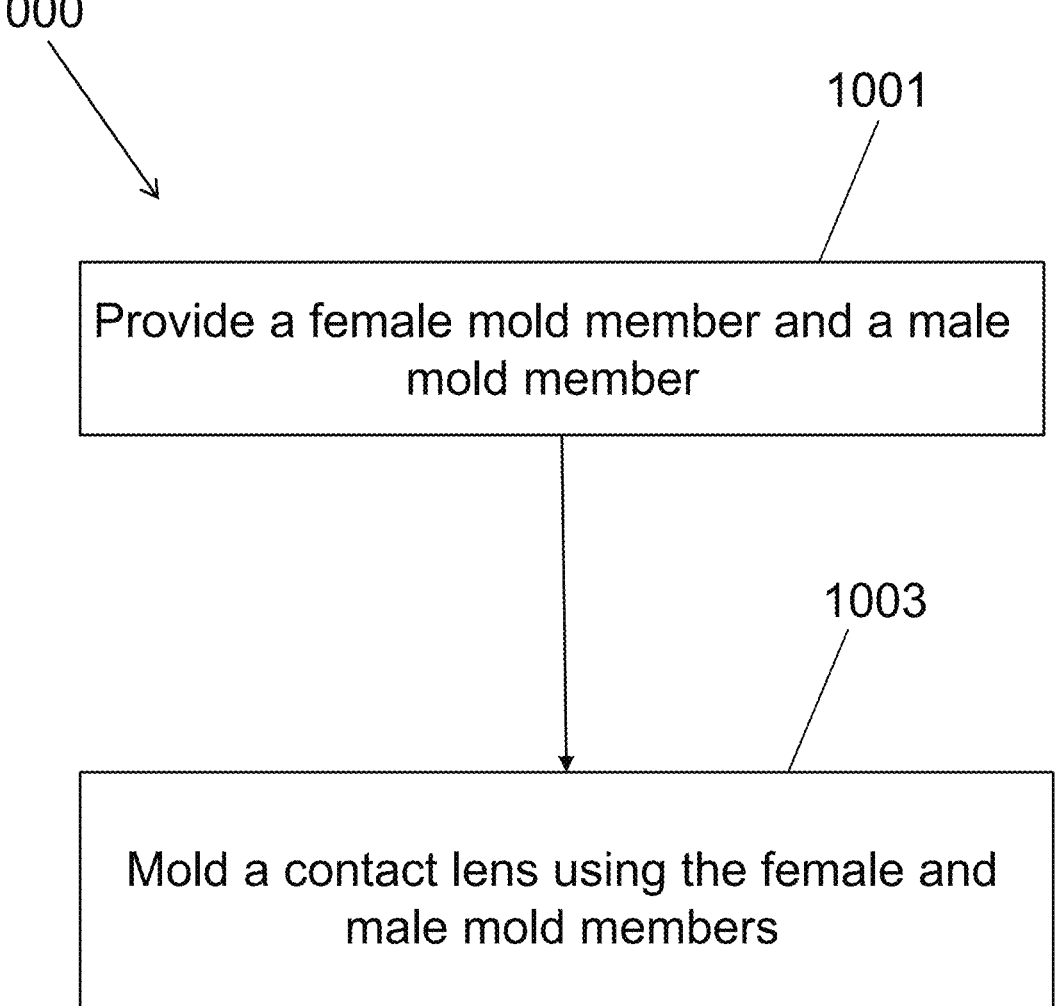
FIG. 12 is a flowchart showing a method of manufacturing a lens according to an embodiment of the present disclosure.

FIG. 12 is a flowchart showing a method 1000 of manufacturing an ophthalmic lens, according to an embodiment of the present disclosure. In a first step 1001, a female mold member having a concave lens forming surface and a male mold member having a convex lens forming surface are provided. The concave lens forming surface is configured to produce a first annular portion of a lens that has a centre of curvature that is separated by a first distance from the optical axis of the lens. The convex lens forming surface is configured to produce a first annular portion of a lens that that is on the optical axis of the lens. In a second step 1003, a lens is cast molded using the male mold member and the female mold members. This step 1003 comprises filling a gap between the female and male mold members with bulk lens material and curing the bulk lens material to form the lens. The lens comprises an optic zone. The optic zone comprises a central region having a centre of curvature that is on an optical axis of the lens, and a first annular portion extending radially outwards from the central region. The first annular portion provides a curvature add power. In this embodiment the anterior surface of the annular treatment portion is produced using a lens forming surface of the concave female mold member, and the anterior surface is configured to produce a first annular portion of a lens that has a centre of curvature that is separated by a first distance from the optical axis of the lens. The posterior surface of the annular treatment portion is produced using the lens forming surface of the convex male mold member, and the posterior surface is configured to produce a first annular portion of a lens that has a centre of curvature on the optical axis of the lens. In other embodiments, the lens forming surfaces of the female and male mold members may be reversed, such that a concave lens forming surface of the female mold member is configured to produce an annular portion of a lens that has a centre of curvature on the optical axis of the lens, and a convex lens forming surface of the male mold member is configured to produce an annular portion of a lens that has a centre of curvature that is separated by a first distance from the optical axis of the lens. In this case, the anterior surface of the annular portion will have a centre of curvature that is on the optical axis of the lens, and the posterior surface of the annular portion will have a centre of curvature that is separated by a first distance from the optical axis of the lens.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A contact lens comprising an optic zone, the optic zone comprising:
  a central portion having a centre of curvature that is on an optical axis; and
  a first annular portion extending radially outwards from the central portion, wherein the first annular portion provides a radial curvature add power, and wherein one of an anterior surface and a posterior surface of the first annular portion has a centre of curvature that is on the optical axis, and the other of the anterior surface and the posterior surface of the first annular portion has a centre of curvature that is separated by a first distance from the optical axis; and
  wherein the surface of the first annular portion having the centre of curvature that is on the optical axis provides a radial curvature add power of between +0.5 D and +4.0 D, and the surface of the first annular portion having the centre of curvature that is separated by a first distance from the optical axis provides a radial curvature add power of between +4.0 D and +20.0 D.

2. The contact lens according to claim 1, wherein the surface of the first annular portion having the centre of curvature that is separated by the first distance from the optical axis has a radial sagittal power profile that increases with increasing radial distance from the optical axis.

3. The contact lens according to claim 1, wherein the surface of the first annular portion having the centre of curvature that is separated by the first distance from the optical axis has a radial sagittal power profile that is defined by a line with a gradient of between 1.0 D/mm and 6.0 D/mm, or a curve with an average gradient of between 1.0 D/mm and 6.0 D/mm.

4. The contact lens according to claim 1, wherein the surface of the first annular portion having the centre of curvature that is separated by the first distance from the optical axis has an average radial sagittal add power of zero across the radial width of the first annular portion.

5. The contact lens according to claim 1, wherein, for the surface of the first annular portion having the centre of curvature that is separated by the first distance from the optical axis, the radial sagittal power at an inner edge of the first annular portion is between 0.5 D and 2.5 D less than the radial sagittal power at an outer edge of the central portion.

6. The contact lens according to claim 5, wherein, for the surface of the first annular portion having the centre of curvature that is separated by the first distance from the optical axis, the radial sagittal power at an outer edge of the first annular region is between 0.5 D and 2.0 D greater than the radial sagittal power at an outer edge of the central portion.

7. The contact lens according to claim 1, wherein both the anterior surface and the posterior surface of the first annular portion provide a radial sagittal add power that is greater than zero across the radial width of the first annular portion.

8. The contact lens according to claim 1, wherein the first annular portion has an average radial sagittal add power of between +0.5 D and +6.0 D.

9. The contact lens according to claim 1, wherein the first annular portion has a radial sagittal power profile that increases with increasing radial distance from the optical axis.

10. The contact lens according to claim 9, wherein the first annular portion has a radial sagittal power profile that is defined by a line with a gradient of between 0.5 D/mm and 5.0 D/mm, or a curve with an average gradient of between 0.5 D/mm and 5.0 D/mm.

11. The contact lens according to claim 1, wherein the first annular portion has an average radial curvature power of between +4.5 D and +24.0 D.

12. The contact lens according to claim 1, further comprising at least one additional annular portion that is concentric to the first annular portion, wherein each additional annular portion provides a radial curvature add power, and wherein for each additional annular portion one of an anterior and a posterior surface of that portion has a centre of curvature that is on the optical axis, and the other of the anterior and the posterior surface of that portion has a centre of curvature that is separated by a distance from the optical axis.

13. The contact lens according to claim 12, wherein the radial sagittal power gradient of each additional annular portion is dependent upon the radial position of the annular portion.

14. The contact lens according to claim 12, wherein a first annular portion has a radial sagittal power profile that increases with increasing radial distance from the optical axis with a first gradient, and a second annular portion has a radial sagittal power profile that increases with increasing radial distance from the optical axis with a second gradient that is smaller than the first gradient.

15. The contact lens according to claim 12, further comprising a plurality of concentric additional annular portions, wherein the additional annular portions are separated by distance portions having a base radial curvature power.

16. The contact lens according to claim 1, wherein the first annular portion extends radially outwards from a perimeter of the central region by between 0.5 and 1.5 mm.

17. The contact lens according to claim 1, wherein the lens comprises an elastomer material, a silicone elastomer material, a hydrogel material, or a silicone hydrogel material, or mixtures thereof.

18. A method of manufacturing a contact lens the method comprising:

forming the contact lens according to claim 1.

19. The method according to claim 18, further comprising:

providing a female mold member with a concave lens forming surface; and providing a male mold member with a convex lens forming surface, wherein one of the concave and convex lens forming surfaces is configured to produce the first annular portion having the centre of curvature that is separated by the first distance from the optical axis of the lens; and the other of the concave and convex lens forming surfaces is configured to produce the first annular portion having the centre of curvature that is on the optical axis of the lens; and using the female and male mold members to form the lens.

20. The method according to claim 19, further comprising:

cast molding the lens using the male mold member and the female mold member.

21. A method of reducing progression of myopia, comprising:

providing a contact lens according to claim 1 to a myopic person who is able to accommodate for varying near distances.

* * * * *